Figure 1:
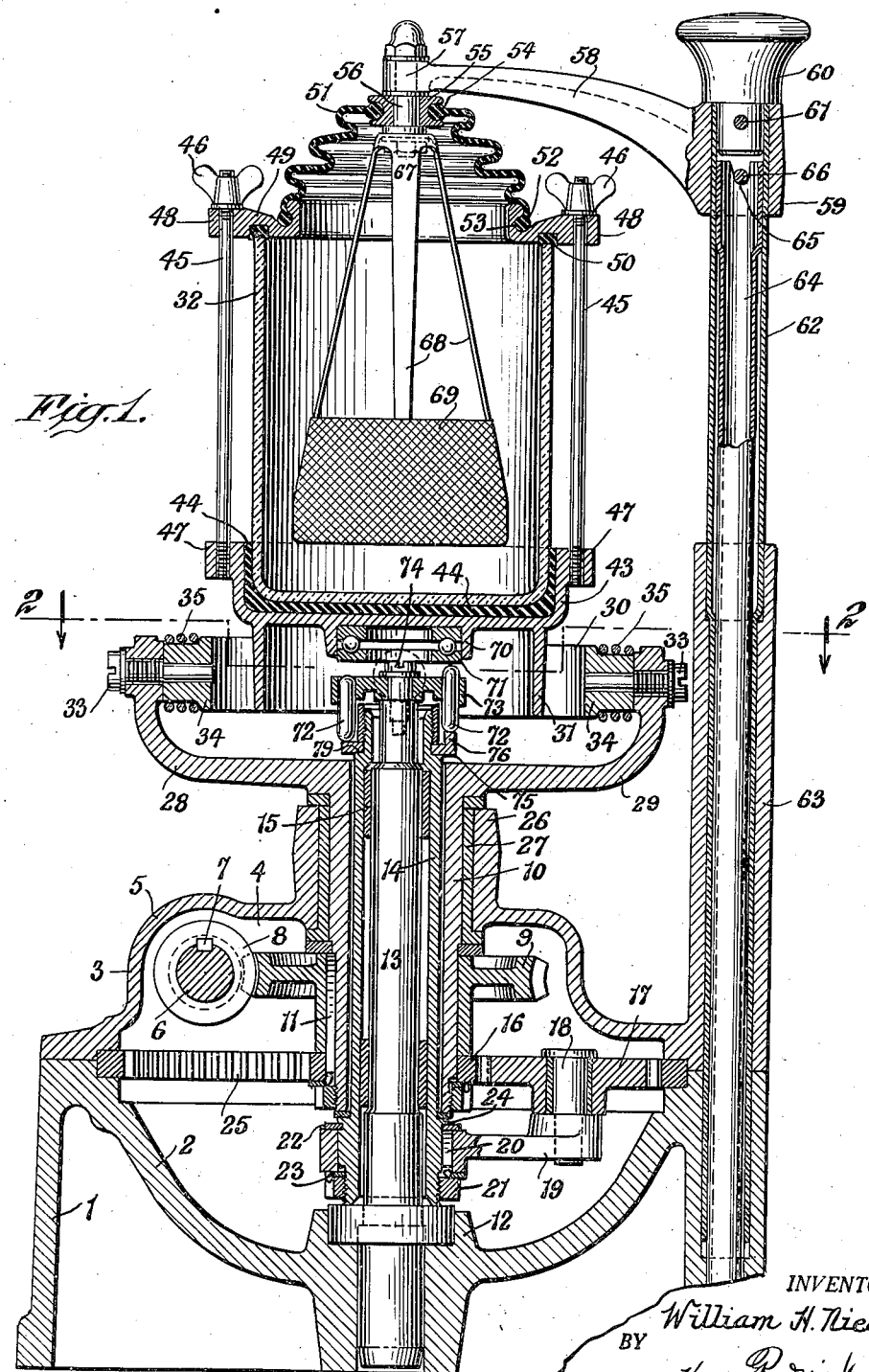

Aug. 30, 1949.　　W. H. NIEDER　　2,480,502
CLEANING MACHINE FOR SMALL PARTS,
PARTICULARLY WATCH OR CLOCK PARTS

Filed Nov. 14, 1947　　2 Sheets-Sheet 1

INVENTOR.
William H. Nieder
BY
Harry Radzinsky
ATTORNEY

Aug. 30, 1949.  W. H. NIEDER  2,480,502
CLEANING MACHINE FOR SMALL PARTS,
PARTICULARLY WATCH OR CLOCK PARTS
Filed Nov. 14, 1947  2 Sheets-Sheet 2
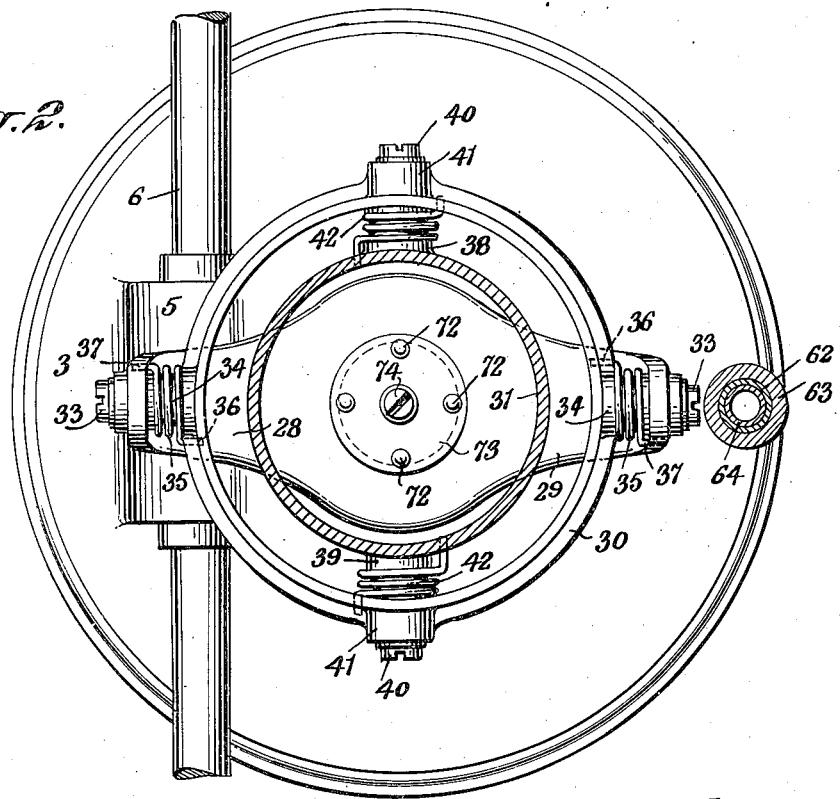
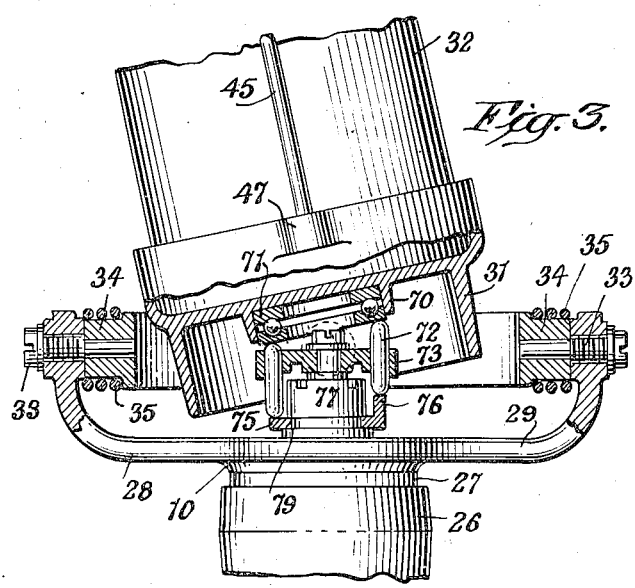
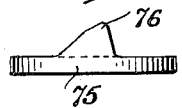
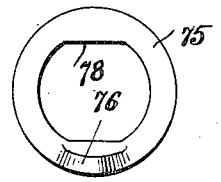
INVENTOR.
William H. Nieder
BY
Harry Radzinsky
ATTORNEY Patented Aug. 30, 1949

2,480,502

UNITED STATES PATENT OFFICE 2,480,502

CLEANING MACHINE FOR SMALL PARTS, PARTICULARLY WATCH OR CLOCK PARTS

William H. Nieder, Chicago, Ill.

Application November 14, 1947, Serial No. 785,952

15 Claims. (Cl. 134—118)

This invention relates to machines for cleaning small parts, such as watch or clock parts or other similar elements, and in which the parts to be cleaned are subjected to the action of a suitable cleaning fluid or oil which is agitated about the parts to frictionally contact the same and penetrate and cleanse all portions thereof.

In most machines of this general character the parts to be cleaned are contained in a wire or mesh basket which is rotated within a container holding the cleansing fluid, or in other words, the parts are moved or rotated through the fluid. I have found that a more efficient cleansing action can be secured by a different mode of operation, namely, one in which the fluid-containing receptacle is rotated either in company with the parts-holding basket or the fluid-containing receptacle is rotated while the parts-containing basket is held stationary, the fluid-containing receptacle being, in each case, rocked or tilted while being rotated.

One of the main objects therefore, of the present invention, is to provide a cleaning machine of this character in which the fluid-containing receptacle is rotated and at the same time is given a vibratory movement by being tilted or rocked. By means of this arrangement, the fluid is not only vigorously swirled about the parts to be cleaned, to thereby apply a frictional or scrubbing action thereto, but is so agitated as to cause the fluid to reach and penetrate all portions or crevices of the parts so that a most complete and effective cleansing action is obtained.

Another object of the present invention is to provide a drive means which permits a plurality of the improved cleaning units to be coupled together and driven from a single drive shaft which is, in turn, operated from a motor or other source of power.

Still another object of the invention is to provide a novel supporting and rotating means for the fluid-containing receptacle, wherein said receptacle is rotated while being rocked or tilted so that a swirling turbulence is given to the cleansing fluid, resulting in very efficient cleaning results.

A further object of the invention is to provide improved supporting means for a parts-basket whereby the same is maintained in a stationary position inside of the fluid-containing receptacle while the latter is rotated and rocked about the parts basket, causing the fluid cleaning material to be swirled and agitated around and through the basket to reach and thoroughly cleanse the parts contained therein.

These and other objects are attained by the invention, a more particular description of which will hereinafter appear and be set forth in the claims appended hereto.

In the accompanying drawings, forming a part hereof Fig. 1 is a vertical sectional view through the machine; Fig. 2 is a sectional view taken on the line 2—2 of Fig. 1 looking in the direction of the arrows; Fig. 3 is a sectional view through the gimbal and associated parts, showing how the fluid-containing receptacle is tilted during rotation; Fig. 4 is a side elevation of the cam for causing tilting movement of the fluid chamber, and Fig. 5 is a top plan view of the cam.

Referring to the drawing, the machine is provided with a housing of which 1 indicates the base portion, the same being shown in the form of a casting having a cup-like chamber 2 closed at the top by a cover member 3 which may be secured in position by screws or other equivalent fastening elements. The base member 1 and the cover 3 therefor thus cooperate in the formation of a hollow chamber 4 in which the operating gearing for the machine is contained, said chamber containing oil or other suitable lubricant in which the gearing may operate with a minimum of wear. The cover member 3 is provided at the top with a boss 5 through which the drive shaft 6 is rotatively operative, said shaft extending from or being driven by an electric motor or other source of power. It will be noted in Fig. 2 that the drive shaft 6 may be extended well beyond the housing of the machine, this extended portion of the shaft enabling the same to extend to and drive a number of similar cleaning machines, thus permitting the machines to be operated in gangs or groups from the same drive shaft.

Within the housing is a worm 8 fixed on the drive shaft 6 by the key 7, said worm 8 engaging and rotating a worm gear 9 held on a tubular, vertically-disposed shaft 10 by means of the key 11. Fixed in and arising from a central boss 12 in the base member 1 of the housing, is a vertical post 13, said post being stationary and constituting the support for a tubular, rotatable cam shaft 14, as well as the outer tubular shaft 10. Spacing bushings 15 are interposed between the cam shaft 14 and the surface of the fixed post 13.

As heretofore described, the outer shaft 10 is rotated by the worm 8 in engagement with the worm gear 9 secured on the shaft 10. The inner or cam shaft 14 is rotated at a much slower rate of speed by an epicyclic gear arrangement including a gear 16 fixed on the outer shaft 10 by key 11, said gear 16 being in mesh with a gear 17 rotative on a pin 18 secured in the end of a crank arm 19 fixed on the lower portion of the cam shaft 14 by a key 20. The arm 19 is maintained on the shaft 14 and held against movement axially of the shaft by means of a nut 21 fitted on the lower threaded portion of the shaft 14, and the washers 22 and 23, the washers and hub portion of the arm 19 being clamped by the nut 21 against a shoulder 24 provided on the cam shaft 14. Fixedly secured between the cover member 3 of the housing and the base 1, is an internally-toothed ring gear 25 in mesh with the gear 17. This arrangement is such that as the outer shaft 10 is rotated, gear 16 thereon will rotate the gear 17. As gear 17 is rotated, the same being in toothed engagement with the teeth on the interior of the fixed ring gear 25, will be caused to be bodily moved around the central post 13 and will thus tend, through the medium of the crank arm 19, to rotate the cam shaft 14 but at a considerably lower rate of rotational speed than that at which the outer shaft 10 is rotated.

The cover member 3 of the housing is provided with a central boss 26 containing a tubular bearing 27 through which the outer shaft 10 extends and within which the same is rotatable. At the top, the outer shaft 10 is provided with a pair of arms 28, 29, forming a yoke, said yoke serving to support a gimbal which consists of an outer ring 30 pivotally supporting an inner ring 31, the latter ring constituting a support for a fluid-containing receptacle 32 to be presently described in further detail. The construction of the gimbal is most clearly shown in Figs. 2 and 3, wherein it will be noted that the outer ring 30 is pivoted at diametrically opposite points on the pivot pins 33 which are threadably mounted in the ends of the arms 28 and 29 of the yoke and enter into the bosses 34 extending laterally from the outer ring 30. A torsional spring 35 extends around each of the bosses 34, each spring having an end 36 engaging under the ring 30 and its other end engaging the arm 28 or 29. This arrangement is such that while the ring 30 may swing or pivot when required, the springs 35 will tend to restore the ring to its normally horizontal position when lifting force applied to tilt the ring is discontinued.

The inner ring 31 of the gimbal is formed with diametrically extending bosses 38 which are pivotal upon pivots pins 40, similar to those shown at 33, but which are fixed in bosses 41 formed on the outer ring between the pivots 33. Torsional springs 42 surround the bosses 39 and serve to maintain the inner ring 31 horizontally in the manner described with respect to the outer ring 30. The arrangement is one in which the gimbal, consisting of the two concentric rings 30 and 31, pivoted as above described permits ready tilting movement so that the fluid-containing receptacle 32, while being rotated, is also tilted or rocked from side to side.

On the top of the inner ring 31 formed a cup-shaped seat 43 lined with a suitable protective material 44 such as soft rubber or the like, and said seat removably receives and holds the fluid-containing receptacle 32. The fluid-containing receptacle 32 may be made of glass or other transparent material permitting its contents to be seen. Oil or other suitable cleansing liquid is contained within the receptacle 32 and in the operation of the machine, the cleansing fluid is agitated about the articles or parts to be cleaned by the rotative and tilting movement of the receptacle 32. The fluid-receptacle 32 is held upon the seat 43 by means of the threaded rods 45 and wing nuts 46 thereon, the lower ends of the rods 45 being threadably received in lugs 47 extending radially from the side wall of the seat 43. The threaded upper ends of the rods 45 freely pass through apertures in lugs 48 extending radially from lid 49 which fits over the top of the fluid-containing receptacle 32 and has a gasket 50 which is clamped against the top edge of the receptacle 32 by the pressure exerted by the wing nuts 46. Thorugh this arrangement, the fluid-containing receptacle is held firmly upon the seat 43 and the lid 49 for the receptacle is firmly held on top of or over the open upper end of the receptacle to seal the same. Included in the lid 49 is a flexible or expansible apron 51, which may be composed of rubber or some similar flexible material not affected by the liquid contents of the receptacle 32. At the lower edge of said apron is provided an expansible ring or bead 52 sprung into and thus removably received in a groove 53 provided in the lid 49. The upper or top end of the apron 51 is provided with a similar ring or band 54 received in a peripheral groove formed in a rotatable collar 55 that is rotative on a stationary pin 56 secured in and extending downwardly from a boss 57 formed at the end of an arm 58. At the opposite end of the arm 58 is provided a head which is composed of a boss 59 and a knob 60. The knob 60 is secured to the boss 59 by means of a transversely extending pin 61, said pin also serving to attach one end of a lengthy tubular sleeve or stem 62 within the boss 59.

Arising from the base member 1 of the housing of the machine is a hollow post or standard 63 constituting a socket member in which the sleeve or hollow stem 62 is inserted. Secured within the post 63 and arising above the upper end of the same, is a tubular post 64 of a diameter which permits the sleeve or stem 62 to be fitted over it and inserted down into the standard 63. The tubular post 64 is provided at its upper end with a notch 65 acting as a seat for a cross pin 66 extending transversely through the boss 59 and through the sleeve or stem 62 carried thereby.

The lower end of the fixed pin 56 carries a spider 67 having a plurality of downwardly dependent arms 68 which carry a parts-containing basket 69 of wire mesh, or of other foraminous material, at their lower ends.

On the under side of the seat 43 for the fluid-containing receptacle 32, is provided a boss 70 in which is fitted a roller thrust bearing 71 adapted to receive successive upward thrusts of four lifter pins or short push rods 72 which are vertically slidable through a guide plate 73 fixedly mounted on the upper end of the stationary center post 13 and held in place thereon by means of the screws 74.

The lifter pins 72 are successively raised and thus caused to tilt or rock the fluid-containing receptacle 32 as shown in Fig. 3, by means of a cam lobe 76 provided on a cam plate 75. The cam lobe 76 thereon rises upwardly from the plate 75, as shown in Figs. 4 and 5, and it operates, when the cam plate is rotated, to lift the several pins 72 one after another. The rotation of the cam plate 75 occurs by reason of the fact that the same is fixed at the upper end of the rotated cam shaft 14. Cam plate 75 is held from rotation with respect to the shaft 14 by being provided with a non-round opening 78 (Fig. 5) which fits around a complementarily-shaped upper end portion provided on the cam shaft 14. A nut 77 threaded on the end of the cam shaft 14 above the cam plate 75 serves to hold the cam plate against a shoulder 79 provided on said shaft, as clearly seen in Figs. 1 and 3.

From the foregoing, the operation of the improved cleaning machine will be readily understood. By unthreading the wing nuts 46 and removing them from the end of the rods 45, the lid 49 of the fluid-containing receptacle can be removed, which can be done by lifting the knob 60. This removes the lid 49, including the apron 51, pin 56, arm 58, basket 59 and the sleeve 62, the latter raising out of the socket post or hollow standard 63 when a lifting force is applied to the knob 60. With the lid thus removed from the top of the fluid-containing receptacle 32, the receptacle may then be partly filled with a suitable cleaning fluid, oil or other liquid intended for cleaning or otherwise treating the parts. The fit of the apron 51 is such that it can be pulled off at any time if desired to lift out the basket 69 by then raising the knob 60, and without requiring complete removal of the lid 49. The parts to be treated are then placed in the basket 69 and the lid is replaced on the receptacle 32 by sliding the tube 62 down over the inner tube 64 until the guide pin 66 seats in the notch 65 as shown in Fig. 1. The placing of the lid 49 in proper seating position on the top edge or rim of the receptacle 32 serves to bring the lugs 48 over the upper ends of the rods 45 and the wing nuts are then replaced upon the upwardly projecting threaded ends of the rods 45, and the machine is then ready for operation.

When the drive shaft 6 is set in rotation it will cause rotation of the outer tubular vertical shaft 10 through the driving means, consisting of the worm 8 and gear 9 and as the yoke on shaft 10, consisting of the arm 28 and 29, is rotated, the fluid-containing receptacle 32, carried by the inner ring 31 of the gimbal, will also be rotated while the parts-basket 69, carried by the fixed pin 56 will remain stationary as the fluid receptacle is rotated around it. By means of the epicyclic gearing previously described, and consisting of the gears 16, 17 and 25 and the arm 19 on pin 18, the cam shaft 14 will also be rotated, but at a rotational speed considerably less than the speed of rotation of the outer shaft 10 and hence at a speed less than the speed of rotation of the fluid-containing receptacle 32. As the cam shaft 14 is rotated, the cam lobe 76 on cam 75 carried by the cam shaft 14, will successively engage and raise the four lifter pins 72, causing the same to tilt the gimbal and the fluid-containing receptacle 32 carried thereby. Thus, while the fluid-containing receptacle is being rotated, it is also being tilted, rocked or vibrated from vertical, and these vibratory movements, coupled with the rotative movements of the fluid-containing receptacle, act to impart a swirling and turbulence to the fluid contents of the receptacle which very effectively causes the fluid contents to frictionally operate against the parts in the basket 69 and reach all crevices or openings in such parts and thoroughly clean or otherwise treat the parts. The expansible apron 51, forming a part of the lid of the fluid receptacle 32, permits tilting movements of the receptacle in the manner described.

Since the drive shaft 6 of the machine may be extended beyond the housing of the machine, this extended portion of the shaft may be employed to drive additional machines of the same character as that herein described.

In the description herein given of the machine, I have stated that the parts basket 69 shall be maintained in a stationary position during the operation of the machine, while the fluid-containing receptacle is rotated and tilted around it. Successful and entirely satisfactory results can also be obtained by fitting the parts basket within the fluid receptacle in such a manner that the parts basket will be rotated with or in company with the fluid-containing receptacle. Hence, I do not wish to be understood as limiting the present invention to an arrangement wherein the parts basket is held stationary while the fluid receptacle is rotated, but intend that it shall comprehend an arrangement wherein both receptacles are rotated.

Having described one embodiment of the invention, it is obvious that the same is not to be restricted thereto, but is broad enough to cover all structures coming within the scope of the annexed claims.

What I claim is:

1. A machine for cleaning small parts comprising, a fluid-containing receptacle, means for supporting the parts to be cleaned within said receptacle, a vertically-disposed tubular shaft and means for rotating the same, an inner shaft within said tubular shaft, means at the upper end of said tubular shaft for pivotally supporting the fluid-containing receptacle to permit of a limited pivotal movement of the receptacle, means for rotating the tubular shaft, means for rotating said inner shaft, a cam carried by said inner shaft, and lifting means interposed between said cam and the fluid-containing receptacle by which the said receptacle will be intermittently tilted while it is being rotated.

2. In a machine for cleaning small parts, a base, a fixed post arising from the base, a plurality of push-rods guided by the upper part of the post, a tubular rotatable shaft surrounding the post, means for rotating said shaft, said shaft carrying a cam rotative below the push rods to successively elevate the same, an outer tubular shaft surrounding the first tubular shaft, means for rotating the second tubular shaft, the last mentioned shaft being provided with a yoke at its upper end, a gimbal supported in said yoke, said gimbal including a pivotal inner ring, a fluid-containing receptacle supported in said inner ring and mounted to tilt with said inner ring, means for supporting parts to be cleansed within the fluid-containing receptacle, the inner ring being provided with means at its lower end to receive the upward and successive thrust of the push rods to thereby tilt the inner ring and the fluid-containing receptacle carried by the same.

3. In a machine for cleaning small parts, a pair of concentrically arranged shafts, means for rotating said shafts at different speeds, a gimbal supported at the top of the outermost shaft, said gimbal including a pivotal inner ring carrying a fluid-containing receptacle, means for supporting parts to be cleaned within the receptacle, the innermost shaft carrying cam means, and push-rods disposed between the cam means and the inner ring of the gimbal to rock the said inner ring and the receptacle carried thereby when the push rods are successively elevated by the cam means.

4. In a machine for cleaning small parts, a base, a fixed post arising from the base, a head secured at the upper end of the post, a plurality of push-rods guided through said head, a tubular rotatable shaft surrounding the post, gearing for rotating said shaft, said shaft carrying a cam at its upper end rotative below the push rods to successively elevate the same, an outer tubular shaft surrounding the first tubular shaft, gear means for rotating the second tubular shaft, the last mentioned shaft being provided with a yoke at its upper end, a gimbal supported in said yoke and having limited pivotal movement therein, said gimbal including a pivotal inner ring, a fluid-containing receptacle supported in said inner ring and mounted to tilt with said inner ring, means for supporting parts to be cleansed within the fluid-containing receptacle, the inner ring being provided with a bearing at its lower end to receive the upward thrust of the push rods to thereby tilt the inner ring and the fluid-containing receptacle carried by the same.

5. In a machine for cleaning small parts, a fluid-containing receptacle, a driven shaft, means for supporting the receptacle from the shaft, said supporting means permitting limited pivotal or rocking movement of the receptacle relative to the shaft, and means for rocking the receptacle while it is being rotated, said means including a cam shaft rotated at a slower speed than that at which the receptacle-carrying shaft is rotated, a cam on the cam shaft and lifter means interposed between the cam and the receptacle for intermittently rocking the receptacle while the same is being rotated.

6. In a machine for cleaning small parts, a fluid-containing receptacle, a basket removably located within the receptacle for holding parts to be cleansed by the fluid in the receptacle, means for rotating the receptacle while the basket is held stationary within it, and means for tilting the receptacle while being rotated and without disturbing the stationary position of the basket.

7. In a machine for cleaning small parts as provided for in claim 6, wherein the rotating means for the receptacle consists of gearing driving a shaft by which the receptacle is carried, the tilting means for the receptacle including a rotating cam and means operated thereby to intermittently tilt the receptacle.

8. In a machine for cleaning small parts, a fluid-containing receptacle, means for supporting said receptacle, means for rotating said supporting means and thereby rotating the receptacle, means for rocking said supporting means and the receptacle while said supporting means and receptacle is being rotated, a parts-basket mounted within the fluid-containing receptacle and held stationary while the fluid-containing receptacle is rotated and rocked relatively to the parts basket, and a support for the parts-basket, a cover for the fluid-containing receptacle, said cover including an expansible portion provided with a central bearing rotative upon the parts-basket support.

9. In a machine for cleaning small parts as provided in claim 8, wherein the parts-basket support includes an arm provided with a pin extending centrally through the bearing in the expansible portion of the cover, a base for the machine, said base having a socket, a post at one end of the arm fitted into said socket, and cooperating positioning means carried by the post and socket.

10. In a machine for cleaning small parts, a supporting base, an upright post supported by and rising from the base, a pair of concentrically-disposed tubular shafts on the post and independently rotatable thereon, means for rotating the outermost one of said shafts, a yoke at the top of said shaft, a gimbal rockingly carried by said yoke and having a limited pivotal movement therein, said gimbal including an inner ring, a fluid containing receptacle carried by said inner ring and caused to be tilted when said ring is tilted, the post being provided with a guide, a plurality of push-rods slidably guided through said guide, a cam carried by the inner tubular shaft, means for rotating said inner tubular shaft whereby its cam will act to successively elevate the push-rods, the push rods being interposed between the inner ring and the cam whereby an elevating movement of any of the push rods will cause the inner ring and the receptacle supported thereby to be tilted while the same are being rotated.

11. In a machine as provided for in claim 10, wherein the inner tubular shaft is rotated at a slower speed than the outer tubular shaft, a basket is provided within the receptacle for holding the parts to be cleansed, and means are provided for supporting said basket whereby the receptacle may be tilted and rotated without affecting the position of said basket.

12. In a machine of the character described, a base, a fixed post arising from the same, a guide-head at the upper end of the post, push-rods guided through said guide, a pair of concentrically-disposed tubular shafts surrounding the post and independently rotated thereon, the inner one of said tubular shafts carrying a cam for successively elevating the push-rods, the outer tubular shaft being provided with means for supporting a gimbal, a fluid-container carried by the gimbal, said gimbal having a part disposed to receive the thrust of the push-rods and be tilted thereby, a drive shaft provided with a worm, a gear carried by the outer tubular shaft and driven by said worm, an internally-toothed ring gear mounted in the base, an arm carried by the inner tubular shaft, a gear carried by said arm and in mesh with the ring gear, and a second gear fixed on the outer tubular shaft and in mesh with the gear carried by the arm.

13. In a machine of the character described, a supporting base, a fixed post arising from the base, a tubular rotating shaft surrounding the post, a cam carried at one end of said shaft and rotative with the same, a plurality of vertically movable push rods mounted at the upper end of the post and located to be successively raised by the cam as said cam is rotated, a second rotative shaft, drive means for the last-mentioned shaft, epicyclic gearing driving the tubular shaft from the second shaft, a two-ring gimbal mounted at an end of the second shaft, the inner ring of said gimbal carrying a receptacle containing a cleaning fluid in which the articles to be cleaned are immersed, said inner gimbal ring having a part located above the push rods whereby said inner ring and the receptacle carried thereby will be tilted by the upward movement of the push rods and while the second shaft is in rotation.

14. In a cleaning machine of the character described, a pair of concentricaly disposed, independently rotated, shafts, the outer shaft of said pair being rotated at a greater rotative speed than the inner shaft, the outer shaft carrying a gimbal at its top, said gimbal including an inner ring, a cleansing-fluid container carried by said inner ring, the inner shaft carrying a cam, thrust means interposed between the inner ring and cam by means of which the inner ring and the receptacle borne by it will be tilted when said thrust means are actuated by the cam, and drive means for the outer shaft, said drive means including a shaft extending beyond the machine for coupling to one or more similar cleaning machines.

15. In a cleaning machine of the character described, a base, a stationary post arising from the base, a tubular shaft surrounding the post, a second tubular shaft surrounding the first tubular shaft, means for rotating the second shaft, a yoke provided at the top of the second shaft, a two-ring gimbal pivotal in said yoke, a cleansing-fluid receptacle supported by the inner ring of the gimbal, a guide-head mounted at the upper end of the stationary post, push rods slidable through said guide head, a thrust-bearing below the inner ring of the gimbal directly below the receptacle and above the push rods, a cam carried by the first shaft, said cam being located below the push rods and adapted to raise the same successively when the cam is rotated, and driving means for the first shaft operative to rotate said shaft at a slower rotative speed than that at which the second shaft is rotated.

WILLIAM H. NIEDER.

REFERENCES CITED

The following references are of record in the file of this patent:

UNITED STATES PATENTS

| Number | Name | Date |
|---|---|---|
| 1,594,516 | Derosha | Aug. 3, 1926 |
| 1,917,829 | Cole | July 11, 1933 |
| 2,194,607 | McDevitt | Mar. 26, 1940 |
| 2,277,508 | Bingham | Mar. 24, 1942 |